United States Patent [19]
Arbeiter et al.

[11] Patent Number: 6,095,010
[45] Date of Patent: Aug. 1, 2000

[54] GEARSHIFT FOR BICYCLE GEARS

[75] Inventors: Markus Arbeiter, Würzburg; Martin Assel, Burgbernheim, both of Germany

[73] Assignee: SRAM Deutschland GmbH, Schweinfurt, Germany

[21] Appl. No.: 09/262,544

[22] Filed: Mar. 4, 1999

[30] Foreign Application Priority Data

Mar. 4, 1998 [DE] Germany ............... 198 09 113

[51] Int. Cl.[7] .................................................. B62M 25/04
[52] U.S. Cl. ..................... 74/473.14; 74/489; 74/502.2
[58] Field of Search ........................ 74/473.14, 489, 74/502.2

[56] References Cited

U.S. PATENT DOCUMENTS

| | | | |
|---|---|---|---|
| 5,012,692 | 5/1991 | Nagano | 74/489 |
| 5,222,412 | 6/1993 | Nagano | 74/502.2 |
| 5,303,608 | 4/1994 | Iwasaki | 74/502.2 |
| 5,676,022 | 10/1997 | Ose | 74/489 |
| 5,682,794 | 11/1997 | Shibata | 74/473.14 |

FOREIGN PATENT DOCUMENTS

| | | |
|---|---|---|
| 0 352 733 B1 | 1/1990 | European Pat. Off. . |
| 0361335 A2 | 4/1990 | European Pat. Off. . |
| 0472739 A1 | 3/1992 | European Pat. Off. . |
| 0615896 A1 | 9/1994 | European Pat. Off. . |
| 0671317 A1 | 9/1995 | European Pat. Off. . |

*Primary Examiner*—Dirk Wright
*Attorney, Agent, or Firm*—Cohen, Pontani, Lieberman & Pavane

[57] ABSTRACT

A gearshift for bicycle gears includes an operating lever arranged so as to be rotatable around a stationary central axis for controlling an operating part arranged in a housing. The operating part is also rotatable around the central axis and has a take-up groove for receiving a gear-shifting cable, whereby a latch interacts with a tooth mechanism on the operating part for winding the cable. The gearshift further includes a release-and-hold mechanism consisting of a first latching disk having a first latching segment and a second latching disk having a second latching segment connected to the operating part, and of a release lever that interacts alternately with the first latching segment and the second latching segment. Arranged on the release lever are a first latching lug and a second latching lug, which alternately engage with the first latching segment and the second latching segment. The release lever is mounted pivotally about a rotational axis arranged substantially perpendicularly relative to the central axis in a stationary fashion. An advantage of the invention lies in the simple operability of the operating lever and the release lever, whereby attention has been given to the ergonomics of the lever that the bicycle gear can be shifted under any circumstances, even when the operating hand of a bicyclist is being used for operating a brake lever.

16 Claims, 3 Drawing Sheets

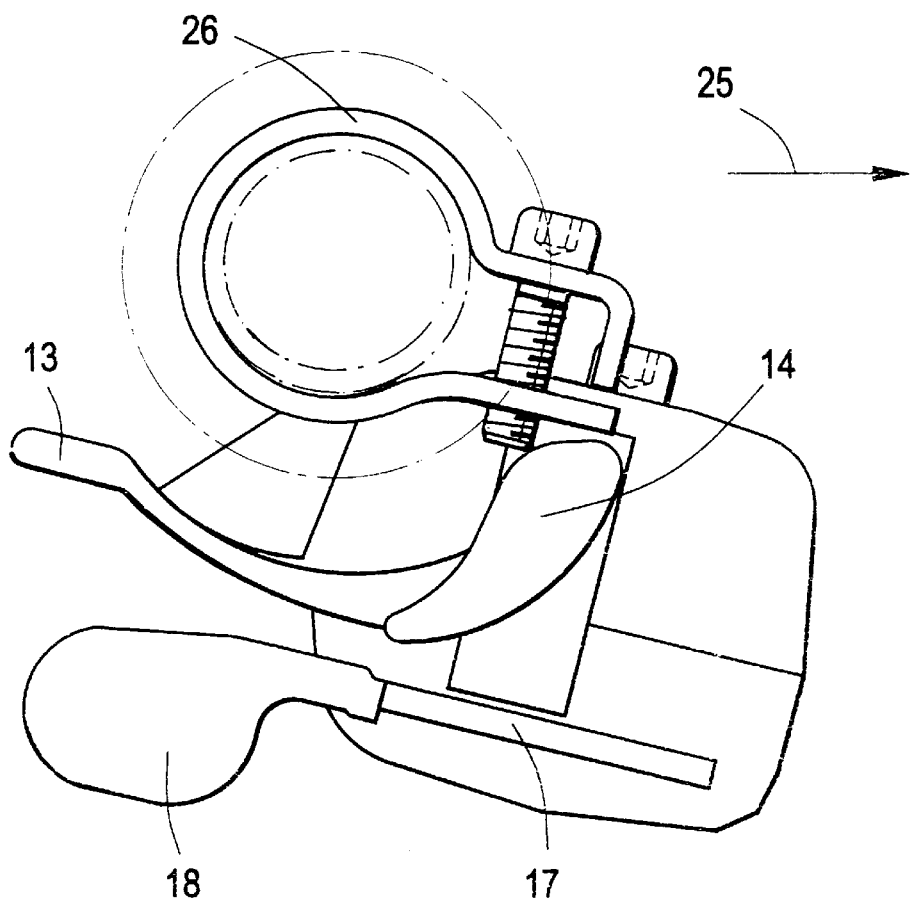
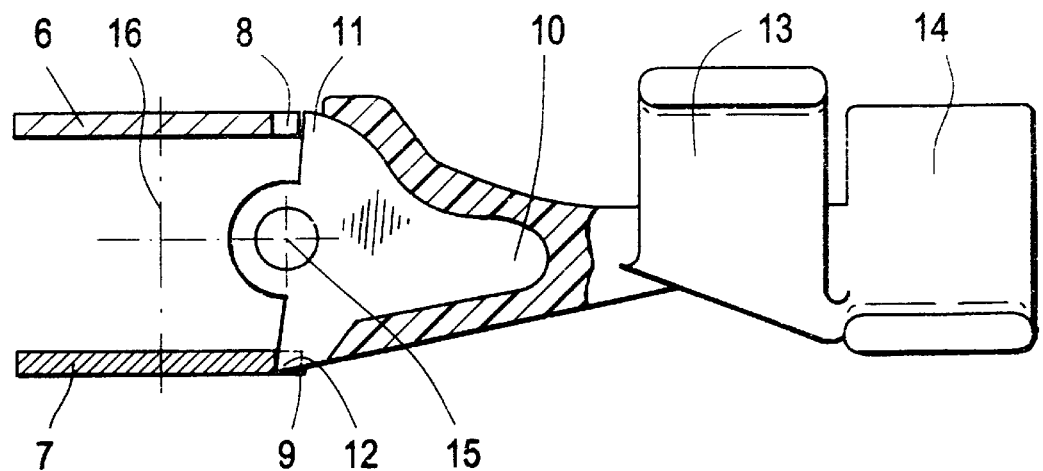

GEARSHIFT FOR BICYCLE GEARS

BACKGROUND OF THE INVENTION

1. Field of the Invention

The present invention relates to gearshifts for bicycles and, more particularly, a bicycle gearshift having an operating lever and a release lever.

2. Description of the Related Art

EP 0 352 733 B1 discloses a gearshift for bicycle gears. The object of the aforementioned invention is to provide an improved gearshift (in this case, a trigger gearshift), in which the cable can be wound up against the spring of the bicycle gear and the release of the cable by a latching mechanism can be implemented by the operation of a single lever. This object is attained by an operating lever that, for the purpose of tensioning the cable, is mounted rotatably around a central axle, whereby a latching mechanism is passed through for each speed as the bicycle is shifted from speed to speed. The latching mechanism can be relieved of load by means of a release lever in such a way that the operating lever is drawn back from the cable into the next latching position for the next speed. The release lever is an integral part of the operating lever, and operates on a plane that is arranged vertically relative to the operating plane of the operating lever. The rotational axle for the release lever is integrated into the operating lever and, during shifting into individual speeds, rotates around the central axle of the operating lever, so that in the extreme positions of the gearshift, i.e. between the mountain gears and the fast gears, the operating lever assumes positions that are disadvantageous with respect to the ergonomics of shifting gears.

SUMMARY OF THE INVENTION

An object of the present invention is thus to provide a gearshift for operating a bicycle gear, whose operating elements, particularly an operating lever and a release lever, are in an ergonomically optimal position in all gears and, after being operated, return to this position.

The present invention separates the operating lever and the release lever, with the goal of always implementing every gear shift, regardless of the gears involved, with the operating lever and the release lever remaining in their same positions. This makes it possible, in particular, to embody the housing-remote end of the release lever in an ergonomic fashion that permits a rider who is operating the brake lever adjacent to the gearshift to simultaneously operate the release lever by pressing the housing-remote end of the release lever with a finger not being used for the braking process.

A preferred embodiment of the inventive gearshift includes a housing, and an operating part rotatably mounted in the housing for rotation about a stationary central axis and having a take-up groove for receiving a gear-shifting cable. The operating part includes a tooth mechanism and a latch configured to cooperate with the tooth mechanism for winding the gear-shifting cable. An operating lever is connected to the operating part and arranged so as to be rotatable about the stationary central axis for controlling the operating part in the housing. A release-and-hold mechanism connected to the operating part includes a first latching disk and a second latching disk. The first latching disk has a first latching segment formed at an outer circumferential edge of the first latching disk. The second latching disk is spaced from the first latching disk and has a second latching segment formed at an outer circumferential edge of the second latching disk.

The release-and-hold mechanism further includes a release lever connected to the latch of the operating part and pivotably mounted at the housing for rotation about a second rotational axis arranged substantially perpendicular to the stationary central axis. In addition, a first and a second latching lug, configured to engage with the first and the second latching segment respectively, are arranged on the release lever such that alternating pivotal movement of the release lever causes the first and the second latching lugs to alternately engage with the corresponding first and second latching segments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference characters denote similar elements throughout the several views:

FIG. 3 depicts the gearshift with a first hand tab and a second hand tab, which are connected to the release lever at its housing-remote end;

FIG. 4 is a partial sectional view of the release lever with a first latching lug and a second latching lug for engagement with a first latching toothed segment and a second latching toothed segment of the first and second latching disks;

DETAILED DESCRIPTION OF THE PRESENTLY PREFERRED EMBODIMENTS

Figure 1:
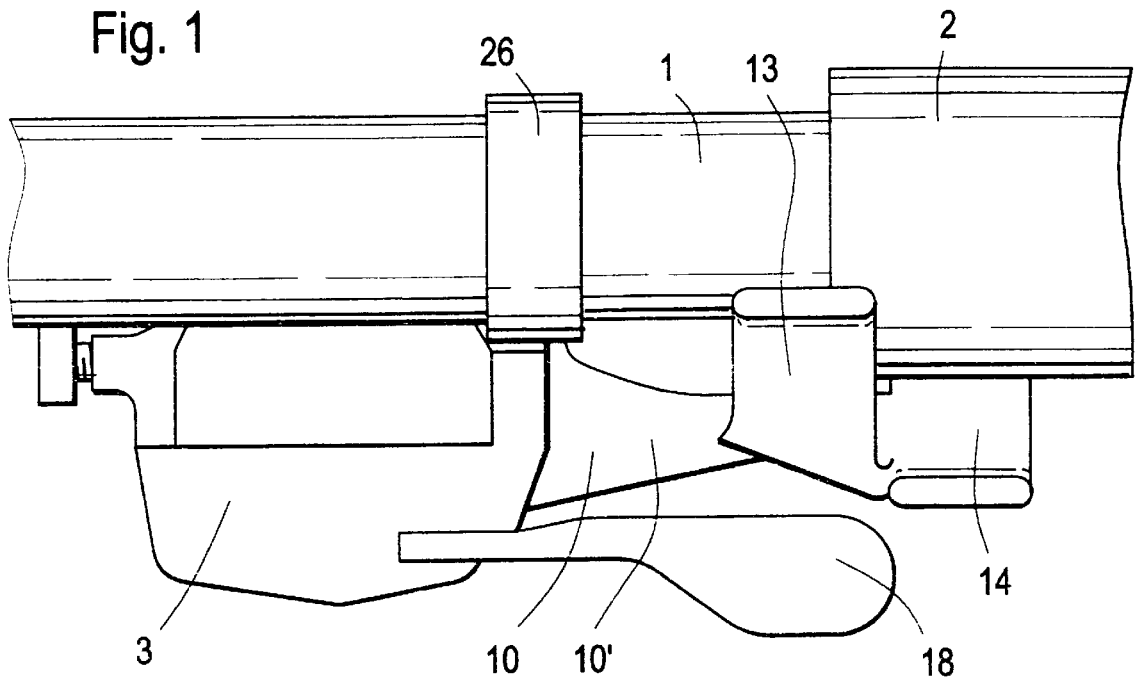
FIG. 1 depicts a gearshift on a bicycle handlebar with a housing, an operating lever and a release lever constructed in accordance with the present invention.
Figure 2:
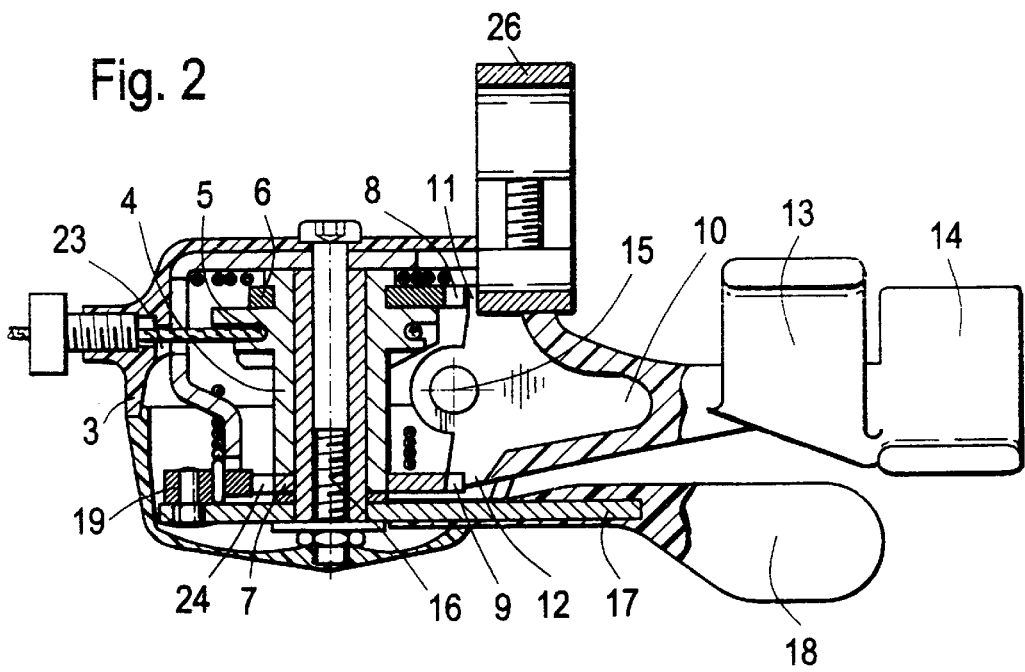
FIG. 2 is a partial sectional view of the gearshift with an operating part around a central axle, with a take-up groove for a cable and with a first latching disk as well as a second latching disk.

FIGS. 1 and 2 show a bicycle handlebar 1, on which is arranged a handle part 2 for the hand of the bicycle rider. A gearshift 3 is attached to the handlebar 1 by means of a clamp 26, and the housing 3 is arranged substantially below the handlebar 1. Arranged in the interior of the housing 3 is a central axle or axis 16, about which an operating part 4 can rotate. Defined on the operating part 4 is a take-up groove 5 for receiving a gear-shifting cable, which is connected to the bicycle gear and can enter the housing 3 via an opening 23.

The gearshift has a release-and-hold mechanism connected to the operating part 4. The release-and-hold mechanism includes a first latching disk 6 and a second latching disk 7. As shown, the first latching disk 6 has a first latching toothed segment 8 and is arranged at the upper end of the operating part 4. At the lower end of the operating part 4, i.e., the end remote from the handlebar, there is a second latching disk 7 having a second latching toothed segment 9 and a tooth mechanism 24. In addition, an operating lever 17 having a handle part 18 is arranged rotatably around the central axle 16, while a latch 19 is pivotably arranged on the operating lever 17 and is urged toward the tooth mechanism 24.

As best seen in FIG. 4, a release lever 10 is pivotally arranged on a stationary rotational axle or axis 15 and has, at its end facing the operating part 4, a first latching lug 11 and a second latching lug 12. The first latching lug 11 engages or interacts with the first latching toothed segment 8, while the second latching lug 12 interacts with the second latching toothed segment 9. The rotational axle 15 extends substantially perpendicularly relative to the central axle 16, whereby the distance of the rotational axle 15 from the central axle 16 corresponds roughly to the radius or radial distance of the latching toothed segments 8 and 9 relative to the center of the respective disks 6, 7. The position of the rotational axle 15 is further defined by its substantially equal distance from the first latching toothed segment 8 and the second latching toothed segment 9. The release lever 10 is resiliently urged by a spring 30 such as, for example, a torsional helical coil spring mounted at the rotational axis 15 such that the second latching lug 12 engages or interacts with the second latching toothed segment 9. In this position, the release lever 10 rests on a stop of the housing 3.

The housing-remote end of the release lever 10 ends in a first hand tab 13 and a second hand tab 14. As shown in FIG. 3, the first hand tab 13 follows the handlebar 1, along a direction of travel 25 (or a forward direction of the bicycle), while the second hand tab 14 precedes the handlebar 1, along the direction of travel 25. In the rest position of the release lever 10, the hand tabs 13 and 14 can be moved upwardly, at a maximum, to the stop on the handle part 2 of the handlebar 1, whereupon the second latching lug 12 of the release lever 10 disengages from the second latching toothed segment 9, while the first latching lug 11 of the release lever 10 enters into engagement with the first latching toothed segment 8.

Figure 6:
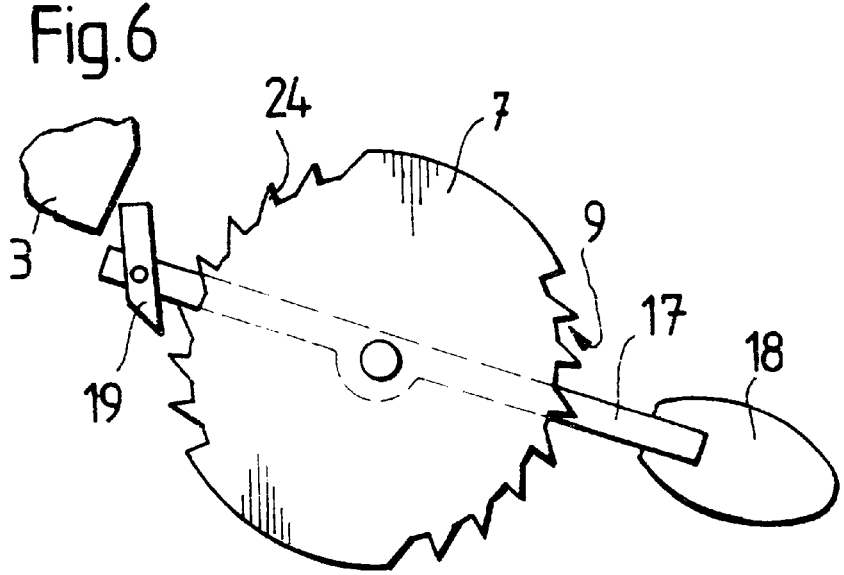
FIG. 6 illustrates the operating lever with a latch controllable from the housing side for interaction with a tooth system on the second latching disk.

In FIG. 6, because the latch 19 is not engaged with the tooth mechanism 24, the operating part 4 is rotated back by the return spring in the bicycle gear. The second latching lug 12, which is engaged with the second latching toothed segment 9, therefore prevents the operating part 4 from rotating back and thus prevents the cable from running out. When the rider operates the release lever 10 by operating one of the hand tabs 13, 14, the second latching lug 12 disengages from the second latching toothed segment 9 and causes the first latching lug 11 to engage at least partially with the first toothed segment 8. As a result, the operating part 4 is rotated by approximately one-half of a gear step. The latching toothed segments 8 and 9 are adjusted to each other by the pointed shape of their teeth in such a way that the alternating engagement of the first latching lug 11 with the first latching toothed segment 8 and of the second latching lug 12 with the second latching toothed segment 9 can occur without dead travel. As a result, when the release lever 10 is released by means of the rider releasing the first hand tab 13 or the second hand tab 14, a downshift occurs from one gear to another.

Figure 5:
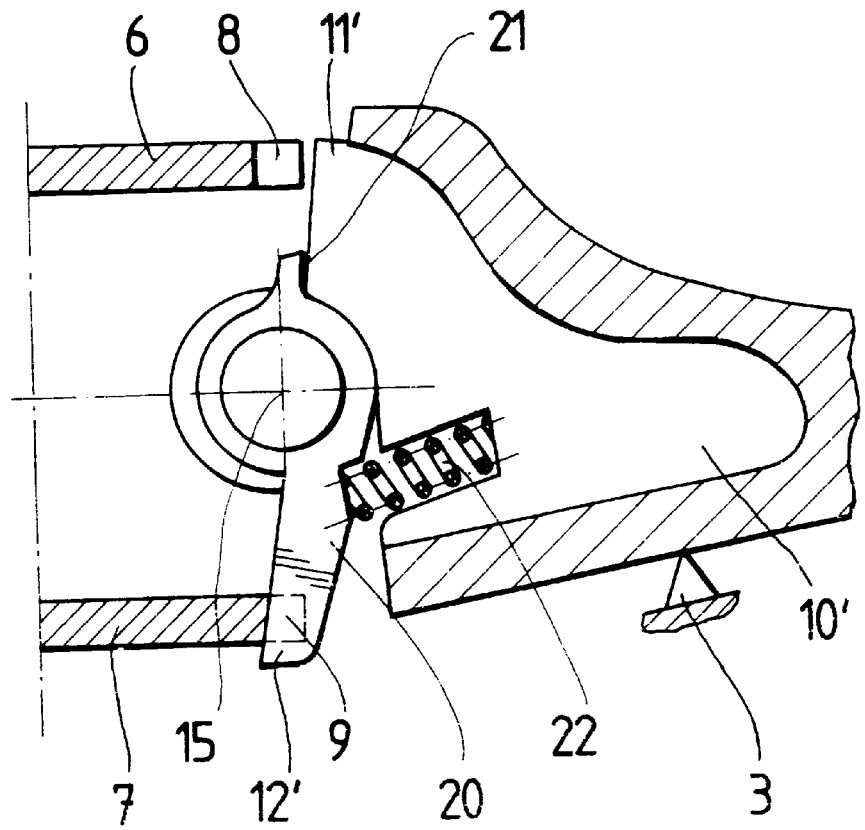
FIG. 5 is a sectional view of the release lever having a holding latch with a latching lug for interaction with the second latching toothed segment of the operating part.

FIG. 5 shows the interaction of a release lever 10' with the first latching disk 6 and the second latching disk 7. A first latching lug 11' interacts with the first latching toothed segment 8 of the first latching disk 6, while a second latching lug 12' interacts with the second latching toothed segment 9 of the second latching disk 7. For functional reasons, the second latching lug 12' is arranged on a holding latch 20. The holding latch 20 has a stop 21 and is connected to the release lever 10' via a spring 22 and a stop 21 as well as via the shared rotational axle 15. The release lever 10' has a stop 32 configured to engage with stop 21 of the holding latch 20. While the release lever 10' is biased on the housing 3 and thus located in the rest position, the holding latch 20 is biased by the spring 22 such that the second latching lug 12' is urged toward the second latching toothed segment 9. Preferably, the spring force of spring 30 urging the release lever 10' toward the housing 3 is greater than the spring force of spring 22 transmitted through the stop 21 of the holding latch 20.

When, by rotation of the operating lever 17, the latch 19 is brought into engagement with the tooth system 24, the second latching disk 7 can be rotated by means of the operating lever 17. As a result, the holding latch 20 with its second latching lug 12' is moved via the slanted teeth of the second latching toothed segment 9, without the release lever 10 being moved out of its rest position. When the operating lever 17 returns to its original position with the controlled latch 19, the second latching disk 7 remains suspended at the position that establishes the engagement of the second latching lug 12' of the holding latch 20 with the second latching toothed segment 9.

An advantage of the invention lies in the simple operability of the operating lever 17 and the release lever 10 or 10'. Furthermore, attention has been given to the ergonomics of the lever embodiment so that the bicycle gear can be shifted under any circumstances, even when the operating hand of the rider is being used for other movements, e.g., for operating a brake lever.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve substantially the same results are within the scope of the invention. It is the intention, therefore, to be limited only as indicated by the scope of the claims appended hereto.

We claim:

1. A gearshift for bicycle gears, comprising:

a housing;

an operating part rotatably mounted in the housing for rotation about a stationary central axis and having a take-up groove for receiving a gear-shifting cable, said operating part including a tooth mechanism and a latch configured to cooperate with said tooth mechanism for winding the gear-shifting cable;

an operating lever connected to the operating part and arranged so as to be rotatable about the stationary central axis for controlling the operating part in the housing; and a release-and-hold mechanism connected to said operating part, including:

a first latching disk having a first latching segment formed at an outer circumferential edge of said first latching disk;

a second latching disk spaced from said first latching disk and having a second latching segment formed at an outer circumferential edge of said second latching disk;

a release lever connected to said latch of said operating part and pivotably mounted at the housing for rotation about a second rotational axis arranged substantially perpendicular to the stationary central axis; and a first latching lug and a second latching lug configured to engage with said first and said second latching segment respectively, said first and said second latching lugs being arranged on said release lever such that alternating pivotal movement of said release lever causes said first and said second latching lugs to alternately engage with corresponding said first and said second latching segment.

2. The gearshift of claim 1, wherein said second rotational axis is disposed at a distance from said central axis, said distance being substantially equal to a radial distance of one of said first and second latching tooth segments from the center of a corresponding one of said first and second latching disks.

3. The gearshift of claim 1, wherein said second rotational axis is arranged substantially equidistant between said first and said second latching segments.

4. The gearshift of claim 1, further comprising a first spring connected to said release lever for resiliently urging said release lever in a direction of engagement with said second latching lug relative to the housing.

5. The gearshift of claim 4, wherein said release lever includes a holding latch operable by said release lever.

6. The gearshift of claim 5, wherein said holding latch includes said second latching lug, and the gearshift includes a second spring extending between said release lever and said second latching lug for resiliently urging said second latching lug in a direction of engagement with said second latching segment.

7. The gearshift of claim 5, further comprising a first stop disposed on said holding latch and a second stop disposed on said release lever, said first and said second stops being configured for contact engagement with one another when said release lever is at a rest position.

8. The gearshift of claim 7, wherein said first spring exerts a greater spring force than that of said second spring at said first stop of said holding latch.

9. The gearshift of claim 1, wherein said latch is pivotally arranged on said operating lever for selective engagement with said tooth mechanism of said operating part.

10. The gearshift of claim 1, wherein said tooth mechanism is connected to one of said first and second latching disks.

11. The gearshift of claim 10, wherein said tooth mechanism and said one of said first and second latching disks are integrally formed.

12. The gearshift of claim 1, wherein the operating lever has a rest position in which said latch is out of engagement with said tooth mechanism.

13. A gearshift for bicycle gears including:

a housing;

an operating part rotatably mounted in the housing for rotation about a stationary central axis and having a take-up groove for receiving a gear-shifting cable, said operating part including a tooth mechanism and a latch configured to cooperate with said tooth mechanism for winding the gear-shift cable;

an operating lever connected to the operating part and arranged so as to be rotatable about the stationary central axis for controlling the operating part in the housing; and a release-and-hold mechanism connected to the operating part, including:
 a first latching disk having a first latching segment formed at an outer circumferential edge of said first latching disk;
 a second latching disk having a second latching segment formed at an outer circumferential edge of said second latching disk; and
 a release lever connected to said latch and pivotably mounted at the housing for rotation about a second rotational axis disposed substantially perpendicular to the stationary central axis, said release lever being configured to engage with said first and said second latching segment respectively such that alternating pivotal movement of said release lever causes said release lever to alternately engage with corresponding said first and said second latching segment, said release lever having a housing-remote end, a first hand tab and a second hand tab extending from the housing-remote end.

14. The gearshift of claim 13, wherein said release lever is configured to be attachable to and below a handle portion of a handlebar.

15. The gearshift of claim 14, wherein said first hand tab is disposed behind said second hand tab along a forward direction of a bicycle.

16. The gearshift of claim 15, wherein said first and second hand tabs have contact surfaces configured for manipulation by a thumb and index finger of a bicyclist.

* * * * *